(No Model.)
S. C. C. CURRIE.
INSULATING APPLIANCE FOR ELECTRIC BATTERIES.
No. 438,532. Patented Oct. 14, 1890.
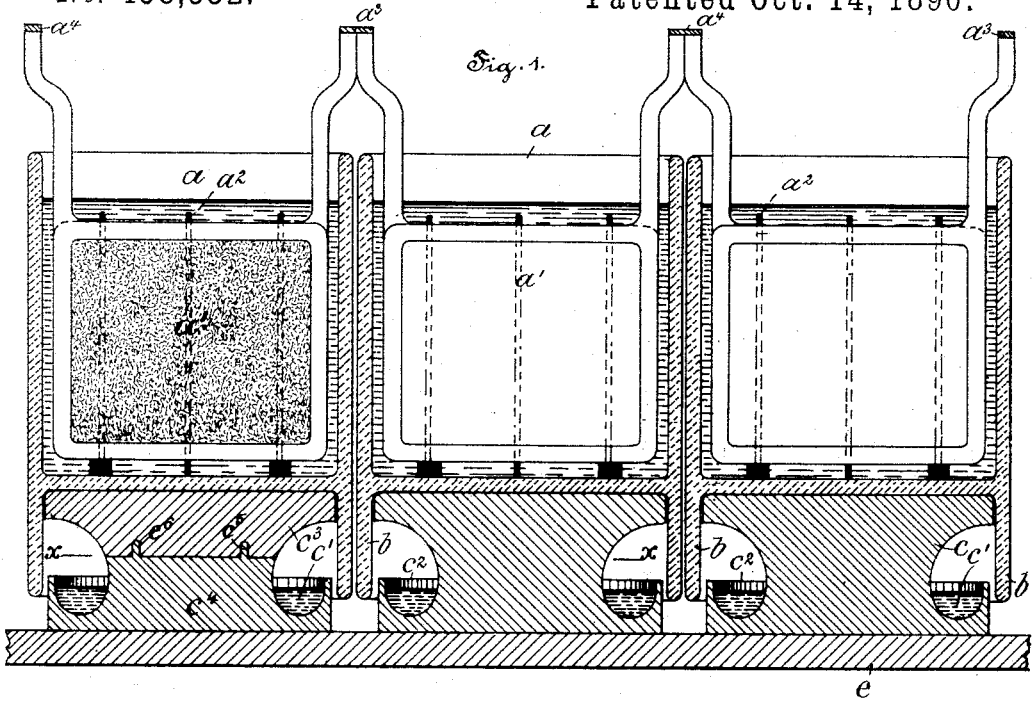
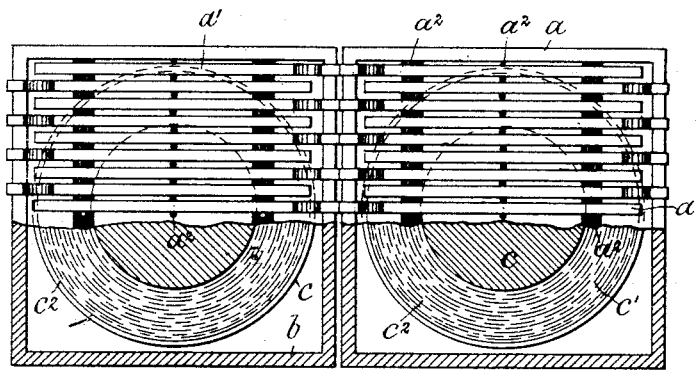
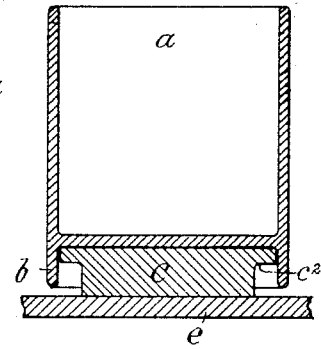
Witnesses:
Hermann Bormann.
Thomas M. Smith.
Inventor:
Stanley C. C. Currie,
by J. Walter Douglass.
Att'y.

UNITED STATES PATENT OFFICE.

STANLEY C. C. CURRIE, OF PHILADELPHIA, PENNSYLVANIA, ASSIGNOR TO THE UNITED GAS IMPROVEMENT COMPANY, OF SAME PLACE.

INSULATING APPLIANCE FOR ELECTRIC BATTERIES.

SPECIFICATION forming part of Letters Patent No. 438,532, dated October 14, 1890.

Application filed June 18, 1890. Serial No. 355,814. (No model.)

*To all whom it may concern:*

Be it known that I, STANLEY CHARLES CUTHBERT CURRIE, a subject of the Queen of Great Britain, but now residing in the city of Philadelphia, in the county of Philadelphia and State of Pennsylvania, have invented certain new and useful Improvements in Insulating Appliances for Electric Batteries, of which the following is a specification.

Heretofore it has been customary to place or stand the vases or jars constituting the cells of an electric battery upon the floor of a suitable receptacle or housing, or upon any convenient flat surface, and to pack them close together, in order to avoid breakage and other injury incident to the transportation of the battery; but in practice the surfaces of adjoining vases, cells, or jars become coated with moisture produced by the spraying and splashing of the liquid and by other causes, and this accumulation of moisture and dampness forms a complete liquid-circuit between the respective cells, jars, or vases, and tends to, or in fact does, short-circuit the battery.

The principal objects of my present invention are, first, to obviate the above-mentioned disadvantages and to prevent electrical surface leakage, and, second, to retain the cells, jars, or vases firmly in position for the accomplishment of the most beneficial results in the practical use thereof.

My invention consists of a cell, jar, or vase provided with a depending rim or skirt adapted to be mounted upon a fixed insulating-base having a recess formed therein, in order to permit moisture to drip from off the depending rim or skirt of the cell, jar, or vase without forming a liquid-circuit from one cell to the other.

My invention further consists of a cell, jar, or vase provided with a depending rim, flange, or skirt adapted for the reception of a fixed insulating-base having a recess formed therein for containing an insulating-fluid, in order that any moisture may be permitted to drop from off the depending rim or skirt without forming a liquid-circuit; and my invention further consists in making the fixed base in two parts or sections united by tenons and mortises and adapted to permit of the convenient separation of the sections thereof, in order to permit the recess formed in connection therewith to be filled with an insulating-fluid.

The nature and characteristic features of my present invention will be more fully understood from the following description, taken in connection with the accompanying drawings, forming part hereof, in which—

Figure 1 is a vertical section of a series of battery cells, jars, or vases mounted on fixed insulating-bases embodying features of my invention, also showing the rims or skirts of the cells, jars, or vases depending beyond the recesses of the bases containing a fluid insulating material or substances. Fig. 2 is a top or plan view, partly in section, on the line $x$ $x$ of Fig. 1, showing the depending rims or skirts surrounding the fixed circular insulating-bases; and Fig. 3 is a vertical section of a cell, jar, or vase in application to a modified form of base of my invention.

In the drawings, $a$ is a vase, cell, or jar adapted to contain the battery plates or elements $a'$, immersed in a suitable exciting-liquid or electrolytic fluid, insulated from one another by means of rods $a^2$, and connected together in any preferred manner by conductors $a^3$ and $a^4$.

$b$ is a depending skirt, flange, or rim, formed by prolonging the sides of the vase, jar, or cell $a$ in a downward direction, or in any other preferred manner, and adapted to be fitted over a stationary base of glass, rubber, porcelain, or any other suitable material. This base $c$, Figs. 1 and 2, is provided with a recess or annular chamber $c^2$, adapted to contain an insulating substance or materials $c'$. It will be noticed that the rim or skirt $b$ extends downward beyond the surface of the insulating substance or materials contained in the recess or annular chamber $c^2$ of the insulating-base $c$, in order to prevent moisture from dropping from off the edge of the skirt or rim onto the insulating material or substance $c'$.

Referring now to the left side of Fig. 1, the base $c$ is formed in two sections $c^3$ and $c^4$, united by tenons $c^5$, fitted into mortises $c^6$, so that the section $c^4$ may be easily removed, in order to refill the recess $c^2$ or for any other purpose.

A modified form of base $c$ is illustrated in

Fig. 3, in which the insulating material or substance $c'$ is dispensed with, and in which the form of the cross-section of the recesses $c^2$ is preferably rectangular in form, in order to reduce, principally, the cost of the manufacture thereof.

In use the bases $c$ are screwed or otherwise attached to a tray or other preferred surface $e$, and are so located or spaced with reference to each other that the sides of two adjacent vases, jars, or cells $a$ are separated from each other by a small space—for example, an eighth of an inch, more or less—and any moisture or dampness collecting upon the surfaces of the jars, cells, or vases $a$ and flowing downward will drop off the lower edges of the rims or skirts $b$ upon the surface $e$. Moisture or dampness accumulating upon the surface $e$ is prevented from climbing by capillary action or otherwise upon the base $c$ into the interior of the jar, vase, or cell $a$ by means of the depending skirt or rim $b$ and the insulating substance or material $c'$, if the latter is employed, thus preventing the formation of liquid-circuits between the respective cells. It may be remarked that inasmuch as the bases $c$ are rigidly attached to the surface $e$ they serve not only to insulate the vases, cells, or jars $a$ from each other and from the ground, but also to retain them firmly to place, so that a battery composed of such cells and bases may be conveniently and safely transported.

Having thus described the nature and objects of my invention, what I claim as new, and desire to secure by Letters Patent, is—

1. An insulating cell, jar, or vase provided with a flat bottom and a depending peripheral rim or skirt, substantially as set forth.

2. An insulating cell, jar, or vase provided with a flat bottom, in combination with a detachable divided base having a chamber connected therewith, substantially as and for the purposes set forth.

3. An insulating cell, jar, or vase provided with a detachable base having a recess or chamber adapted to contain an insulating substance or material, substantially as and for the purposes set forth.

4. An insulating-base for supporting battery-plate cells, jars, or vases, provided with a recess or chamber adapted to receive and contain an insulating substance or material, substantially as and for the purposes set forth.

5. An insulating-battery-plate cell, jar, or vase provided with a depending flange or rim, in combination with a recessed or channeled base, substantially as and for the purposes set forth.

6. A cell, jar, or vase provided with a depending rim or skirt, in combination with a base provided with a recess or chamber adapted to receive a fluid, substantially as and for the purposes set forth.

7. A cell, jar, or vase provided with a depending rim or skirt, in combination with a divided base provided with a recess or chamber adapted to contain an insulating-fluid, substantially as and for the purposes set forth.

8. A cell, jar, or vase provided with a depending rim or skirt, in combination with a base provided with a recess or chamber adapted to contain an insulating substance or material, and the said base formed in two sections tenoned and mortised to each other, substantially as and for the purposes set forth.

9. The combination, with a series of recessed or channeled insulating blocks or bases secured to or mounted on a tray or platform and a series of cells, jars, or vases provided with depending rims or skirts placed in proximity to one another, and the rims or skirts of said cells, jars, or vases depending below the surface of the recesses or channels of said insulating blocks or bases, of plates or elements immersed in a suitable exciting-liquid or electrolytic fluid in said cells, jars, or vases, and said plates provided with conductors or terminals, substantially as and for the purposes set forth.

In witness whereof I have hereunto set my signature in the presence of two subscribing witnesses.

STANLEY C. C. CURRIE.

Witnesses:
FRANCIS E. BUCHER,
F. H. MACMORRIS.